United States Patent [19]

Lukehart

[11] Patent Number: 4,800,666
[45] Date of Patent: Jan. 31, 1989

[54] METHOD AND APPARATUS FOR TEMPORARILY IMMOBILIZING AN EARTHWORM

[76] Inventor: Loren Lukehart, 4391 Greer, Boise, Id. 83703

[21] Appl. No.: 161,144

[22] Filed: Feb. 26, 1988

[51] Int. Cl.⁴ .............................................. A01K 97/02
[52] U.S. Cl. ............................................ 43/4; 43/4.5; 43/55
[58] Field of Search ................. 43/4, 4.5, 54.1, 55, 43/56, 57.1

[56] References Cited

U.S. PATENT DOCUMENTS

| | | | |
|---|---|---|---|
| 1,929,833 | 10/1933 | Vanvuren | 43/54.1 |
| 2,257,879 | 10/1941 | Graham | 43/55 |
| 2,507,319 | 5/1950 | Peters | 43/55 |
| 2,527,214 | 10/1950 | Graves | 43/55 |
| 3,193,966 | 7/1965 | Lawson et al. | 43/55 |
| 3,423,869 | 1/1969 | Duerst | 43/55 |
| 3,566,836 | 3/1971 | Elfert | 43/55 |

Primary Examiner—M. Jordan
Attorney, Agent, or Firm—Frank J. Dykas

[57] ABSTRACT

Method and apparatus for immobilization of an earthworm 13 to facilitate the baiting of a fishing hook. To immobilize the earthworm, the earthworm is partially coated with sharp grained sand 11 having a grain size of less than 1/20th of an inch. The apparatus 10 for carrying out the method consists of rectangular container 12 and a reservoir of sharp grained sand 11 and cover 14. Placing earthworm 13 in the apparatus 10 and allowing earthworm 13 to at least partially coat itself with sharp grained sand 11, results in the temporary immobilization of earthworm 13. Earthworm 13 is then impaled on the fishing hook by the fisherman. As soon a the baited hook is immersed in water, the sand is rinsed from earthworm 13 and it resumes wiggling.

3 Claims, 1 Drawing Sheet

METHOD AND APPARATUS FOR TEMPORARILY IMMOBILIZING AN EARTHWORM

BACKGROUND OF THE INVENTION

1. Technical Field.

This invention relates to the immobilization of live bait for use in fishing. In particular, the invention relates to a method and apparatus for the dewiggling of earthworms.

2. Background Art.

The use of live bait in fishing has long been known to be one of the most effective means for catching fish. The problem with live bait is that any creature has a natural tendency to resist the baiting process. A further complication in the specific case of earthworms is that they are naturally slimy. The ability of the earthworm to curl its body in almost any direction, connected with the fact that it is coated with slimy film, makes it extremely difficult for the fisherman to impale the earthworm with the fishing hook.

GRAHAM, U.S. Pat. No. 2,257,879, discloses a bait box having a compartment that is filled with a dry sand. The worm is dropped into the dry sand which adheres to the worm's body which makes it easier for the fisherman to hold onto the worm. The problem with the method is that the worm is still able to wiggle and curl its body, making it difficult for the fisherman to impale the worm on the fishing hook.

Accordingly, it is the object of this invention to provide a means for immobilizing an earthworm and thereby facilitating the impalement of the earthworm on a fishing hook by the fisherman.

DISCLOSURE OF INVENTION

These objects are accomplished by coating the earthworm with small sharp grained sand. Small sharp grained sand, as opposed to regular dry sand, has a dramatic affect on the worm's ability to curl its body.

A small rectangular container of sufficient length to harbor an earthworm is partially filled with sharp grained sand having a grain size equal or less than 1/20th of an inch. The rectangular container is also fitted with a removable cover which prevents sand spillage during transport. To dewiggle a worm, the fisherman has to simply set the worm in the rectangular container on top of the sharp grained sand. During the worm's natural locomotion process, the sand becomes partially imbedded in the earthworm and causes an immediate reaction wherein the earthworm completely relaxes. The earthworm is then effectively dewiggled and ready to be impaled onto the fishing hook.

Once the sand coated earthworm is immersed in water, the sand rinses free and the earthworm resume its normal wiggly character.

BEST MODE FOR CARRYING OUT INVENTION

Figure 1:
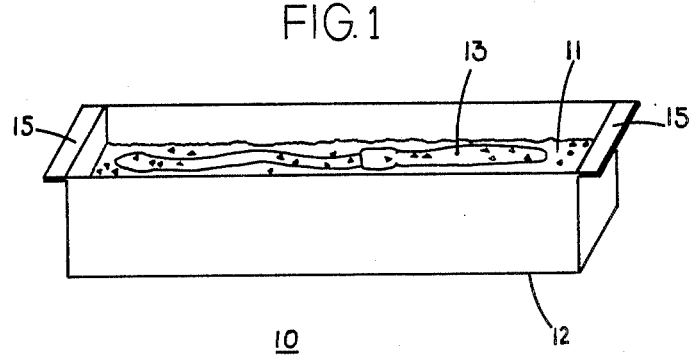
FIG. 1 is a top perspective view of the container and sand reservior with a worm.
Figure 2:
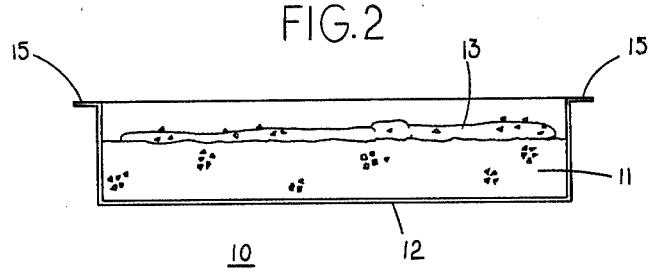
FIG. 2 is a sectional side view of the container and sand reservoir with a worm.
Figure 3:
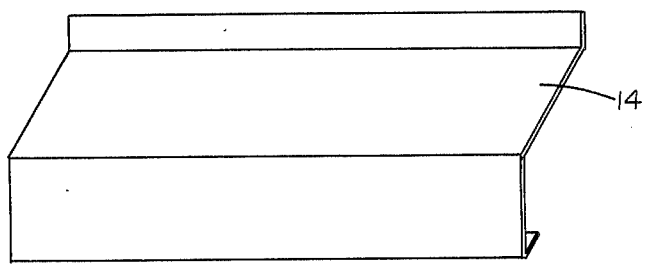
FIG. 3 is a perspective view of the container cover.

Referring to FIGS. 1, 2 and 3, an apparatus for the immobilization of earthworms is generally designated as 10 and is illustrated in its preferred embodiment. The first and only step in the immobilization of an earthworm by the preferred method is to coat the earthworm with small sharp grained sand 11 having a grain size equal to or less than 1/20th of an inch by momentarily depositing earthworm 13 on sand 11.

The preferred apparatus for the immobilization of an earthworm has a reservoir of sharp grained sand 11 having a grain size equal to or less than 1/20th of an inch, and a rectangular container 12 for housing the sand reservoir.

Sand reservoir container 12 is sized for transverse insertion into a standard bait box, not shown. Retainer lips 15 are attached to and extend perpendicularly out from the top edges of the ends of container 12. Retainer lips 15 are sized for cooperative engagement with the top edges of the sides of the bait box, so that when container 12 is transversely inserted into a bait box it is held suspended above the bottom of the bait box which contains a mixture of live worms and humus material.

Cover 14 is contoured to provide for a seal for sand reservoir container 12 and is held in place by the lid of the standard bait box.

To immobilize earthworm 13, one merely deposits earthworm 13 on top of sand 11. During the earthworm's natural locomotion process individual grains of sand 11 become partially imbedded in earthworm 13 and causes an immediate immobilizing reaction in earthworm 13. As a result earthworm 13 will rapidly straighten out and become immobilized. Since earthworm 13 is covered with grains of sand 11, it is not only immobilized, but also easy to pick up and handle.

Once earthworm 13 has been impaled upon the fisherman's hook, not shown, and immersed in water, said 11 washes off earthworm 13 and earthworm 13 will resume wiggling.

While there is shown and described the present preferred embodiment of the invention, it is to be distinctly understood that this invention is not limited thereto but may be variously embodied to practice within the scope of the following claims.

Accordingly, what I claim is:

1. An apparatus for temporarily immobilizing an earthworm which comprises:
    a container for housing the a reservoir of sand;
    a reservoir of sharp sand having a grain size of 1/20th of an inch or less.

2. The apparatus of claim 1 wherein said container further comprises:
    a rectangular shaped container for holding a reservoir of sand, said rectangular container having a length slightly less than the width of a standard bait box;
    retainer lips attached to and extending perpendicularly from the ends of said rectangular container for cooperative engagement with the top edges of the sides of a standard bait box for transversely suspending and supporting the rectangular container within the bait box;
    a cover for cooperative engagement with the rectangular shaped container for containing the sand.

3. A method for immobilizing an earthworm which comprises partially coating said earthworm with a sharp grained sand having a grain size equal to or less than 1/20th of an inch.

* * * * *